US009600715B2

(12) United States Patent
Natan et al.

(10) Patent No.: US 9,600,715 B2
(45) Date of Patent: Mar. 21, 2017

(54) EMOTION DETECTION SYSTEM

(71) Applicant: INTEL Corporation, Santa Clara, CA (US)

(72) Inventors: Ofir Natan, En Yaakov (IL); Ayoob Nabwani, Julis (IL)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 14/752,100

(22) Filed: Jun. 26, 2015

(65) Prior Publication Data

US 2016/0379047 A1   Dec. 29, 2016

(51) Int. Cl.
*G06K 9/00* (2006.01)
*G06K 9/46* (2006.01)
*G06K 9/42* (2006.01)

(52) U.S. Cl.
CPC ..... *G06K 9/00315* (2013.01); *G06K 9/00281* (2013.01); *G06K 9/42* (2013.01); *G06K 2009/00328* (2013.01)

(58) Field of Classification Search
CPC .......... G06K 9/18; G06K 9/46; G06K 9/4604; G06K 9/228; G06K 9/32; G06K 9/00315; G06K 9/42; G06K 9/00281
USPC ........ 704/270, E13.008, 251, 276, 231, 258, 704/200; 382/100, 115, 118, 224, 209, 382/181, 190, 201; 345/418, 473, 156
See application file for complete search history.

(56) References Cited

U.S. PATENT DOCUMENTS

| 5,960,099 A * | 9/1999 | Hayes, Jr. | G06K 9/00268 382/117 |
|---|---|---|---|
| 7,221,809 B2 * | 5/2007 | Geng | G06K 9/00288 345/419 |
| 7,340,393 B2 * | 3/2008 | Mitsuyoshi | G06K 9/00335 704/200 |

(Continued)

OTHER PUBLICATIONS

"Intel RealSense Technology", <Retrieved from Internet on Feb. 1, 2016> from <URL: https//software.intel.com/en-us/articles/realsense-overview>, May 23, 2014, 4 pages.

(Continued)

*Primary Examiner* — Sheela C Chawan
(74) *Attorney, Agent, or Firm* — Finch & Maloney PLLC

(57) ABSTRACT

Emotion detection systems disclosed herein actively protect the privacy and security of monitored subjects. This provision of protection differentiates these systems from conventional emotion detectors. In some examples, a self-contained emotion detection device protects the identity of a subject while providing anonymous data descriptive of the subject's emotional state to other devices within the emotion detection system. In these examples, the emotion detection device protects the identity of the subject by isolating raw image data acquired by the device exclusively within storage locations encapsulated within the device. To provide the anonymous data, the emotion detection device first processes the raw image data to identify landmark points within an image of the subject's face. Next, the emotion detection device normalizes the landmark points to a generic face and transmits an anonymous data set descriptive of the normalized landmark points to the other devices for subsequent processing.

24 Claims, 8 Drawing Sheets

(56) References Cited

U.S. PATENT DOCUMENTS

| | | | | |
|---|---|---|---|---|
| 7,824,409 B2* | 11/2010 | Howie | ............. | A61F 2/4601 |
| | | | | 606/86 R |
| 8,154,615 B2* | 4/2012 | Fedorovskaya | ........ | G06Q 30/02 |
| | | | | 348/222.1 |
| 8,155,400 B2* | 4/2012 | Bronstein | ............. | G06T 17/00 |
| | | | | 345/419 |
| 8,285,257 B2* | 10/2012 | Isobe | ............. | H04M 3/533 |
| | | | | 455/412.1 |
| 8,705,813 B2* | 4/2014 | Matsuyama | ....... | G06K 9/00281 |
| | | | | 348/169 |
| 9,036,018 B2* | 5/2015 | Wang | ............. | G06K 9/00315 |
| | | | | 345/420 |
| 9,105,119 B2* | 8/2015 | Whitehill | ............. | G06K 9/00 |
| 2003/0182123 A1 | 9/2003 | Mitsuyoshi | | |
| 2004/0101212 A1 | 5/2004 | Fedorovskaya et al. | | |
| 2009/0285456 A1 | 11/2009 | Moon et al. | | |
| 2009/0324017 A1 | 12/2009 | Gordon et al. | | |
| 2013/0300891 A1 | 11/2013 | Bacivarov et al. | | |

OTHER PUBLICATIONS

PCT Search Report and Written Opinion for PCT Application No. PCT/US2016/033737 mailed on Sep. 12, 2016, 13 pages.

* cited by examiner

EMOTION DETECTION SYSTEM

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

Conventional emotion detectors acquire and record data descriptive of a person's reaction to an event. Conventional emotion detectors also analyze the recorded data to interpret the person's emotional reaction to the event. The reactions recorded, analyzed, and interpreted by emotion detectors include a person's speech, facial expressions, physiological signals, device usage patterns, etc. To be effective, many emotion detectors require that the person exhibit a threshold level of activity. For example, emotion detectors based on a person's speech require that the person utter one or more detectable expressions. Similarly, emotion detectors based on device usage patterns require a person to manipulate an object (e.g., a mouse or keyboard) to establish a baseline usage pattern. Other emotion detectors require that sensors be in physical contact with a person to be effective. For example, emotion detectors based on a person's physiological state require that the person don one or more sensors (e.g., electrocardiogram electrodes, skin conductance sensors, etc.). Advantages introduced through the use conventional emotion detectors include a systemic ability to persistently record and later analyze a person's reaction to system-generated events.

DETAILED DESCRIPTION

Figure 1:
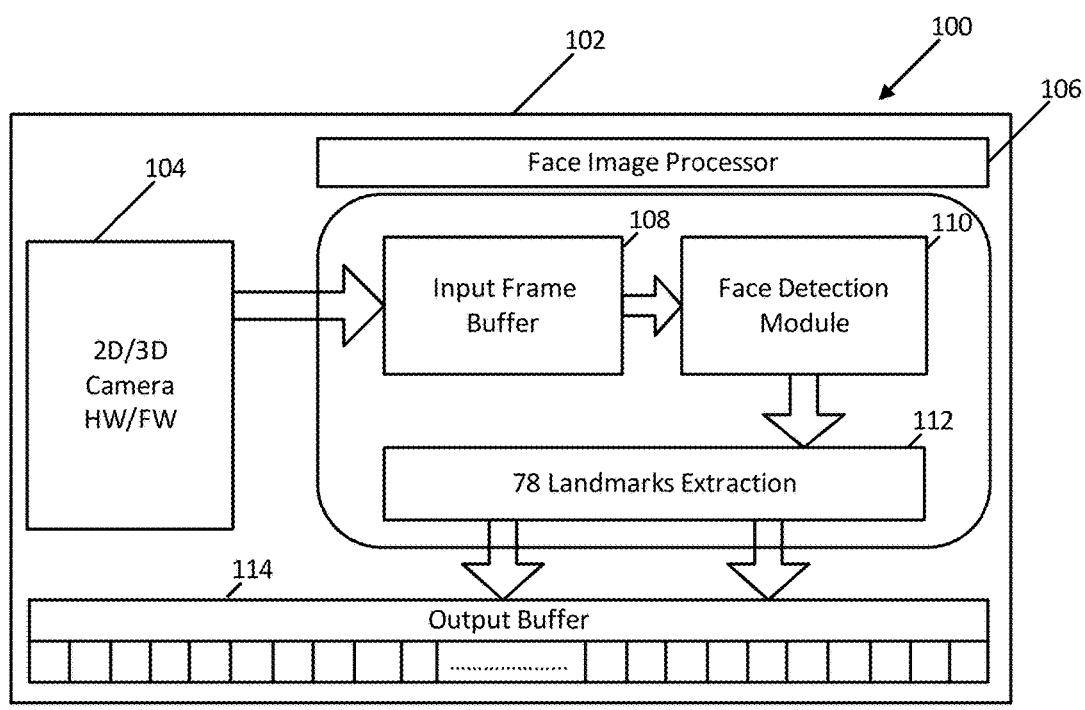
FIG. 1 illustrates an emotion detection device configured in accordance with an embodiment of the present disclosure.

Emotion detection systems disclosed herein actively protect the privacy and security of monitored subjects. This provision of protection differentiates the systems described herein from conventional emotion detectors. In some example embodiments, a self-contained emotion detection device protects the identity of a subject while providing anonymous data descriptive of the subject's emotional state to other devices within the emotion detection system. In these examples, the emotion detection device protects the identity of the subject by isolating raw image data acquired by the device exclusively within storage locations encapsulated within the device. To provide the anonymous data, the emotion detection device first processes the raw image data to identify landmark points within an image of the subject's face. Next, the emotion detection device normalizes the landmark points to a generic face and transmits an anonymous data set descriptive of the normalized landmark points to the other devices for subsequent processing. In some examples, the other devices process the anonymous data set to identify and record the emotional state of the subject in association with information descriptive of stimuli being presented to the subject. This stimuli may include non-interactive content (e.g., books, television, movies, radio programs, music, advertisements, etc.). The stimuli may also include interactive content (e.g., games, shopping, etc.). In some examples, the other devices within the emotion detection system attempt to affect the emotional state of the subject by adjusting the stimuli (e.g., adjusting a price, plotline, music genre, etc.). While various example embodiments provided herein refer to facial images, other target features can be used as well to assess emotional state of a subject, such as voice recordings, body posture and/or gesture images, and biometric data such as heart rate and blood pressure, to name a few examples. As will be appreciated, the techniques provided herein can be used to encapsulate any such target raw data within the device, identify landmark points within that data, and normalize the landmark points to a generic model (such as a generic voice model that repeats the user's inflections and raised tones using a generic voice, or a generic torso model that repeats the user's body language and/or gestures using a generic body). In any such example cases, the anonymous data set descriptive of the normalized landmark points can be transmitted to the other devices for subsequent processing.

Still other aspects, embodiments and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. References to "an embodiment," "other embodiments," "an example," "some embodiments," "some examples," "an alternate embodiment," "various embodiments," "one embodiment," "at least one embodiment," "another embodiment," "this and other embodiments" or the like are not necessarily mutually exclusive and are intended to indicate that a particular feature, structure, or characteristic described in connection with the embodiment or example may be included in at least one embodiment or example. The appearances of such terms herein are not necessarily all referring to the same embodiment or example. Any embodiment or example disclosed herein may be combined with any other embodiment or example.

Also, the phraseology and terminology used herein is for the purpose of description and should not be regarded as limiting. Any references to examples, embodiments, components, elements, or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

General Overview

As previously explained, conventional emotion detectors provide a number of benefits, but also suffer from disadvantages as well, depending on the application. With respect to privacy, for instance, most human subjects do not wish to be subjected to constant surveillance. This is especially true where the surveillance persistently records their exact likeness and conduct. In addition, most human subjects are concerned about surveillance records being miss-used, stolen, or otherwise used without their permission. For purposes of contrast, most human users are not as opposed to express themselves or have their emotional reactions anonymously analyzed, as they are opposed to having camera continuously recording their every move.

Thus, and in accordance with some examples of the present disclosure, emotion detection devices and systems are provided, wherein output data indicative of emotional states of a subject is anonymous (i.e., the output data does not indicate the personal identity of the subject, such that, for example, the subject's actual identify is not included in the output data). Such emotion detection devices and systems differ from conventional emotion detectors at least by generating anonymous data by, for example, normalizing data to a model of a generic subject. In some such examples, this anonymous data is the sole output provided by the emotion detection device. In these examples, the emotion detection device deletes information that may be used to identify a subject (e.g., information descriptive of the subject's face, voice, body posture and gesturing or other detectable, identifying traits) prior to providing the anonymous data. In this way, these examples provide additional protection to the privacy and security of the subject being monitored.

In some examples, the emotion detection devices are incorporated into emotion detection systems that include additional features. For instance, some examples comprise an emotion detection system that includes one or more emotion detection devices, one or more remote devices that analyze anonymous data transmitted by the emotion detection devices, and a network coupling the emotion detection devices to the remote devices. In these examples, the remote devices receive the anonymous data and mine the anonymous data to classify the emotional states of individual subjects. Emotion identifiers indicating the emotional state of individuals are then securely stored for subsequent processing.

In some examples, the emotion detection systems further include one or more stimulus controllers. In these examples, a remote device may be configured to automatically control the operation of one or more stimulus controllers. This control may be instigated by analysis of anonymous data or emotion identifiers. For instance, in some examples, a remote device analyzes the anonymous data set of a subject and identifies a responsive action to execute that is associated with the anonymous data. Responsive to identifying the responsive action, the remote device executes the responsive action. For instance, where the remote device detects a negative emotional state in association with a first stimulus, the remote device may identify a responsive action specifying a second stimulus. In response to identifying such as responsive action, the remote device may automatically generate and transmit a stimulus message to at least one stimulus controller to generate the second stimulus. In this example, in response to receiving the stimulus message, the stimulus controller presents the second stimulus to the subject.

These and other examples disclosed herein provide a variety of additional advantages over conventional emotion detectors. For instance, in some examples described herein, no actual filming of the subject is performed, no image data is persistently stored, and raw image data is analyzed by a specialized device (e.g., an emotion detection device) rather than by a general purpose programmable device (e.g., a personal computer, laptop, smartphone, tablets, etc.). For purposes of contrast vis-à-vis conventional emotion detectors, this technique prevents the general purpose programmable device from analyzing the raw image data in the upper layers of the software stack, where the raw image data is more exposed to privacy and security threats. In other examples, the emotion detection device deactivates a camera, microphone, or other input used to acquire input data descriptive of the identity of a subject after the input data is acquired. In this way, these examples increase the difficulty of gaining unauthorized access to the input data and the output data. Further, according to some examples, an emotion detection system effectively harnesses the anonymous data to accomplish many valuable actions, as described in further detail below.

In a more specialized example, an emotion detection system monitors emotional states of subjects using facial images. This emotion detection system is convenient for the subject because it is less invasive and requires a lower threshold of subject activity than other types of emotion detection systems. Further, this emotion detection system addresses subjects' concerns regarding unauthorized recording or use of their likenesses by capturing, analyzing, and deleting image data within a self-contained, unitary emotion detection device. One example of such an emotion detection device, a private emotion recognition sensor (PERS) is described further below.

This emotion detection device may include a camera, a face image processing component, data storage, and a data transmission component. In some examples, the camera acquires image data descriptive of the subject's face. The face image processing component processes the image data to generate an anonymous set of data descriptive of the physical state of the subject's face. This anonymous data set may be further analyzed to determine details regarding the emotional state of the subject but cannot be used to determine the identity of the subject. This device can be readily extrapolated to other emotion-indicating features. For instance, in another embodiment, the emotion detection device may include a microphone, a voice processing component, data storage, and a data transmission component. In such examples, the microphone acquires voice data descriptive of the subject's verbal utterances. The voice processing component processes the voice data to generate an anonymous set of data descriptive of the state of the subject's voice (with respect to inflection, loudness, etc). This anonymous data set may be further analyzed to determine details regarding the emotional state of the subject but cannot be used to determine the identity of the subject. In other examples, the emotion detection device may include a camera, a body posture, and gesture image processing component, data storage, and a data transmission component. In such examples, the camera acquires body posture and/or gesture data descriptive of the subject's body posture and gesturing state. The image processing component processes the image data to generate an anonymous set of data descriptive of the physical state of the subject's body and/or gesturing. This anonymous data set may be further analyzed to determine details regarding the emotional state of the subject but cannot be used to determine the identity of the subject. Numerous other variations will be apparent in light of this disclosure. The choice of specific target emotion-indicating features will depend on factors such as desired computational burden in processing the data to identify emotional state of the subject. Any such target emotion-indicating features can be analyzed and used on their own as variously provided herein, or in conjunction with other target emotion-indicating features in effort to gain a more comprehensive understanding of a given subject's emotional state (e.g., face and voice, or face and gesture, etc). In any such cases, raw emotion-indicating data is translated into an anonymous equivalent, and the raw data itself can be discarded so as to protect the identity of the subject.

Emotion Detection Device

FIG. 1 illustrates one example of an emotion detection device, a PERS 100. The PERS 100 may be implemented using a programmable device, such as may be fabricated using any of the components of the systems described below with reference to FIGS. 9 and 10. As shown in FIG. 1, the PERS 100 includes a housing 102 in which is disposed a camera 104, a face image processor 106, and an output buffer 114. In some examples, the housing is made of plastic, aluminum, or some other durable material. The housing 102 may include fasteners that enable the housing to be installed at various locations and orientations or a variety of structures. For example the housing 102 may include a clamp, resin, hook and loop fastener or other mechanism to enable the emotion detection device to be installed on a counter, computer monitor, wall, billboard, sign, chair, security camera, or other location. In some examples, the camera 104 is a two-dimensional camera. In other examples, the camera 104 is a three-dimensional camera. In some examples, the PERS 100 further includes a network interface with circuitry (e.g., a wired or wireless transceiver, connector, antenna, etc.) and a software stack that collectively enable the PERS 100 to communicate with other devices via a communication network.

As depicted in FIG. 1, the face image processor 106 includes an input frame buffer 108, a face detection module 110, and a landmark point extraction module 112. The input frame buffer 108 and the output buffer 114 may be allocated from a variety of data storage, such as on-chip memory or off-chip memory, included within the housing 102. The face detection module 110 and the landmark point extraction module 112 may be implemented in hardware or a combination of hardware and software. Examples of processes that the face image processor 106 is configured to execute via the face detection module 110 and the landmark point extraction module 112 are described further below with reference to FIGS. 2 and 3.

Figure 2:
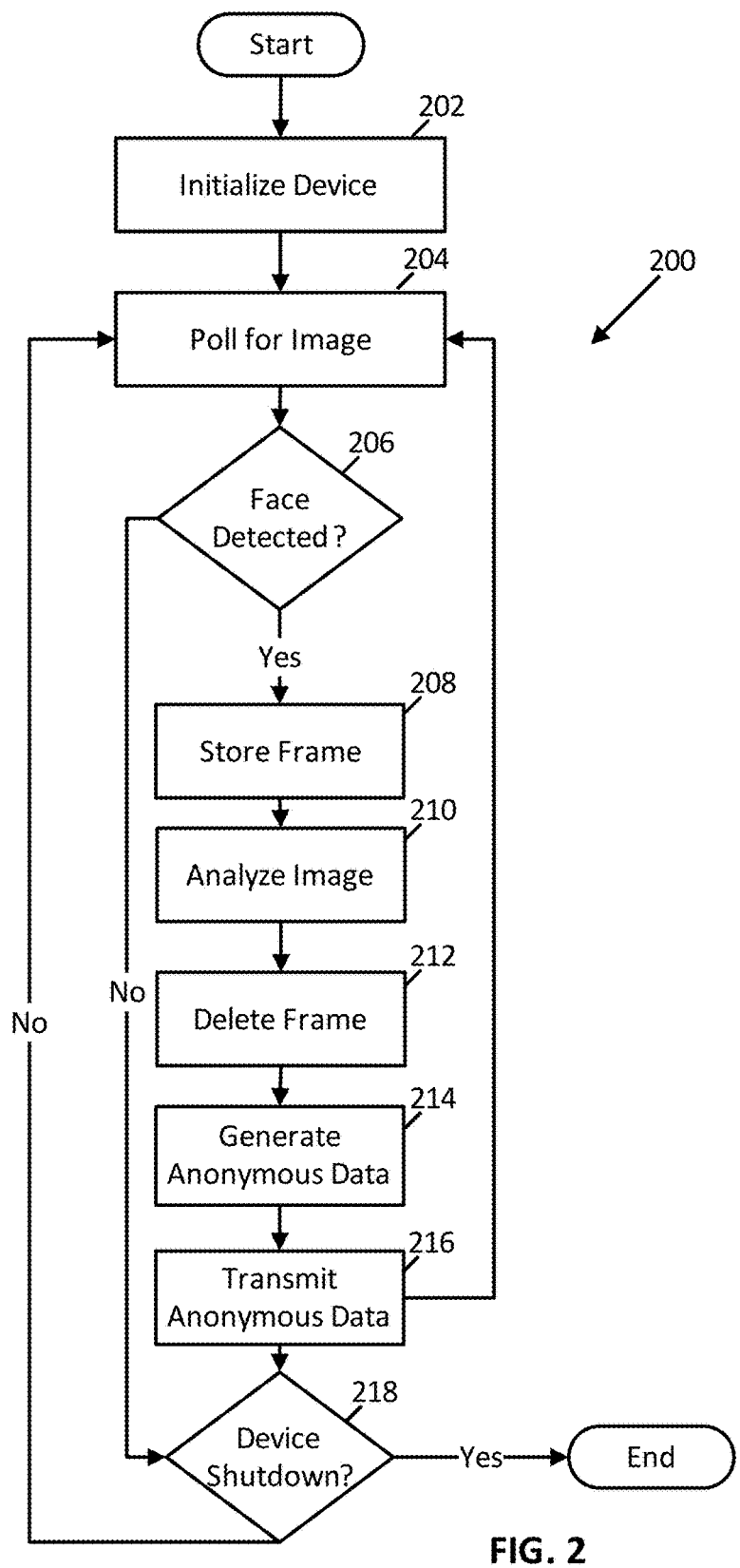
FIG. 2 illustrates an emotion detection process configured in accordance with an embodiment of the present disclosure.

According to some examples, an emotion detection device executes processes that generate anonymous data indicative of the emotional state of a subject. FIG. 2 illustrates a detection process 200 in accord with these examples. As shown in FIG. 2, the detection process 200 includes several acts that, in combination, enable an emotion detection device to privately and securely provide an anonymous data set descriptive of one or more facial expressions to other devices for subsequent processing.

In act 202, the device executing the detection process 200 initializes one or more components of the device (e.g., a camera, memory, processor, networking interface, image processing module, etc.). In act 204, the device polls the camera for image data. The image data may include one or more frames. These frames may include raw image data of a subject's face. In some examples, the raw image data includes three-dimensional image data. In other examples, the raw image data includes two-dimensional image data.

In act 206, the device determines whether any of the one or more frames includes an image of a face of a subject. If so, the device proceeds to act 208. Otherwise, the device proceeds to the act 218. In the act 208, the device stores the frame for subsequent processing. Also, in at least one example, the device deactivates the camera within the act 208 as a security measure. By deactivating the camera in the act 208, the device helps ensure that additional image data is not acquired by any authorized processes executing on the device.

In act 210, the device analyzes the image to identify and store data indicative of an emotional state of the subject. In some examples, the device executes Intel® Realsense™ technology to identify landmark points within the image of the face. Landmark points are a collection of points that specify the identity and orientation of facial features such as lips, eyebrows, eye lids, etc. In one example, the device identifies 78 landmark points that, in combination, indicate the emotional state of the subject.

In act 212, the device deletes the frame as an additional security measure. By deleting the frame in the act 212, the device limits the amount of time that the frame is stored and the amount of time that the frame and landmark points coexist in the storage of the device.

In act 214, the device generates an anonymous data set by normalizing the landmark points identified in the act 210 to a generic face. This normalization process may be accomplished by mapping each landmark point identified within the image of the face to a corresponding landmark point within a model of a generic face such that the overall expression of the face is translated from the image of the face to the generic face. In some examples, the anonymous data set includes elements of data with fields storing values that identify the point and the location of the point on the model of the generic face. The values stored in these location fields may include two-dimensional or three-dimensional information. Next, in the act 212, the device stores the anonymous data set for subsequent processing.

In act 216, the device transmits the anonymous data set to an address specified by the value of a predefined configurable parameter. This address may be a local address, i.e., an address of a component that is integral to the device, or a remote address, i.e., an address of a component that is not integral to the device. In act 218, the device determines whether shutdown in imminent. If so, the detection process 200 ends. Otherwise, the detection process 200 proceeds to the act 204.

Processes in accord with the detection process 200 enable emotion detection devices to privately and securely generate and communicate data descriptive of the emotional state of a subject.

Figure 3:
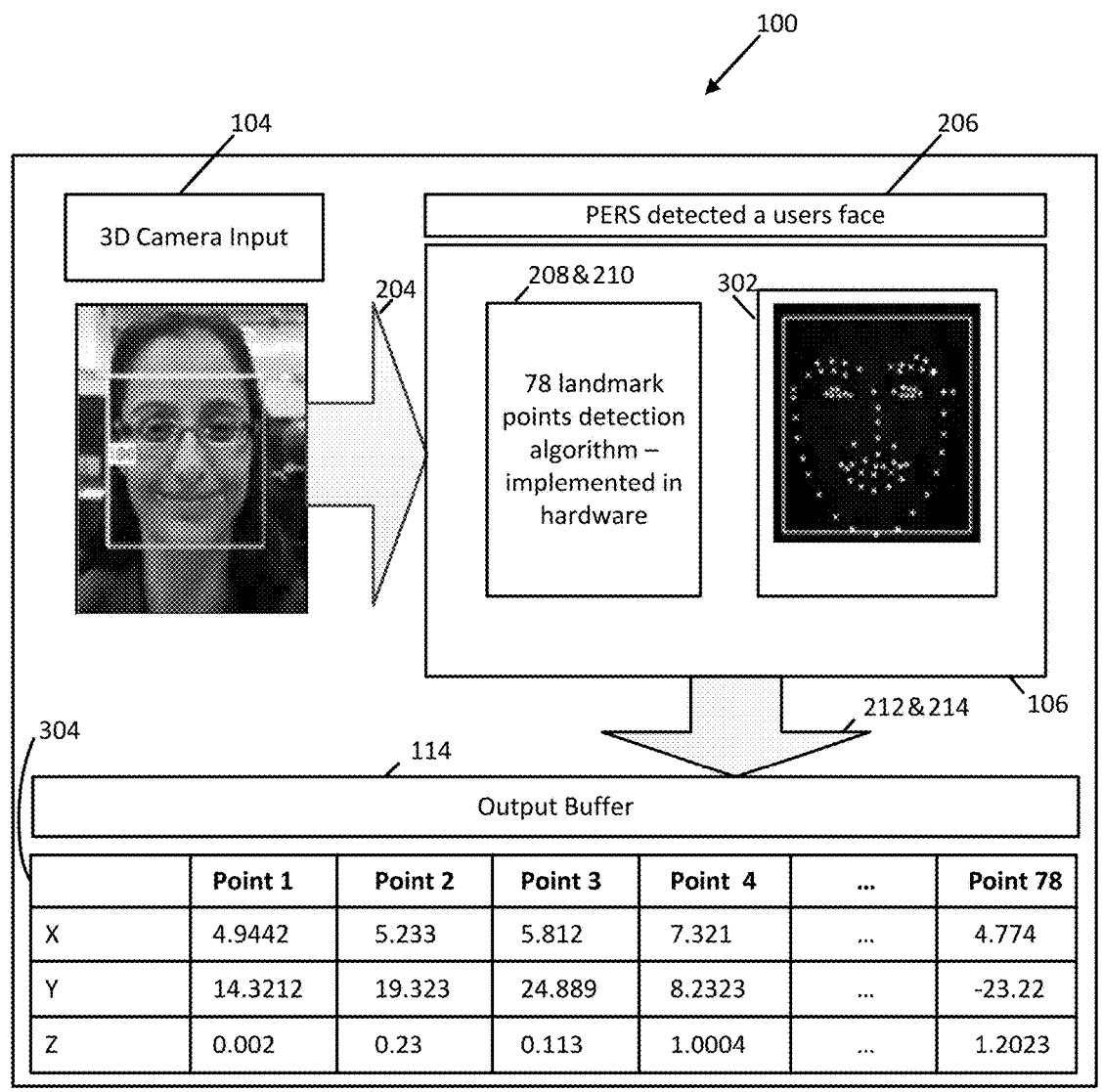
FIG. 3 illustrates an emotion detection device executing an emotion detection process configured in accordance with an embodiment of the present disclosure.

FIG. 3 is an input-output diagram that illustrates the operation of one example emotion detection device. More specifically, FIG. 3 depicts the PERS 100 of FIG. 1 executing the detection process 200 of FIG. 2. With primary reference to FIG. 3 in the combination of FIGS. 1 and 2, the PERS 100 executes the act 204 to poll the camera 104 for an image. The camera 104 acquires a frame including a three-dimensional image and transmits the frame to the face image processor 106. The face detection module 110 of the face image processor 106 detects a face in the image by executing the act 206 and stores the frame in the input frame buffer by executing the act 208. Next, the landmark point extraction module 112 of the face image processor 106 executes the act 210 to analyze the image and identify landmark points, as illustrated by the collection of points 302.

Continuing this example, the face image processor 106 executes the acts 212 and 214 to delete the frame, generate an anonymous data set 304, and store the anonymous data set in the output buffer 114. At this point, the PERS 100 may execute the act 216 to transmit the anonymous data set to another device for additional processing.

While the components described above process image data to determine an emotional state of a subject, other examples use other identifiable traits of a subject to the same end. For instance, in one example, an emotion detection device implements an architecture analogous to the architecture illustrated in FIG. 1 to determine an emotional state of a subject by processing vocal utterances made by the subject. In these examples, the face image processor 106 is replaced with a voice processor configured to detect a human vocal utterances and extract an anonymous data set descriptive of the emotional state of the subject as expressed by the vocal utterances. This anonymous data set may include data descriptive of the words uttered and the manner in which the words were vocalized (e.g., volume, pitch, speed, etc.).

Emotion Detection System

Figure 4:
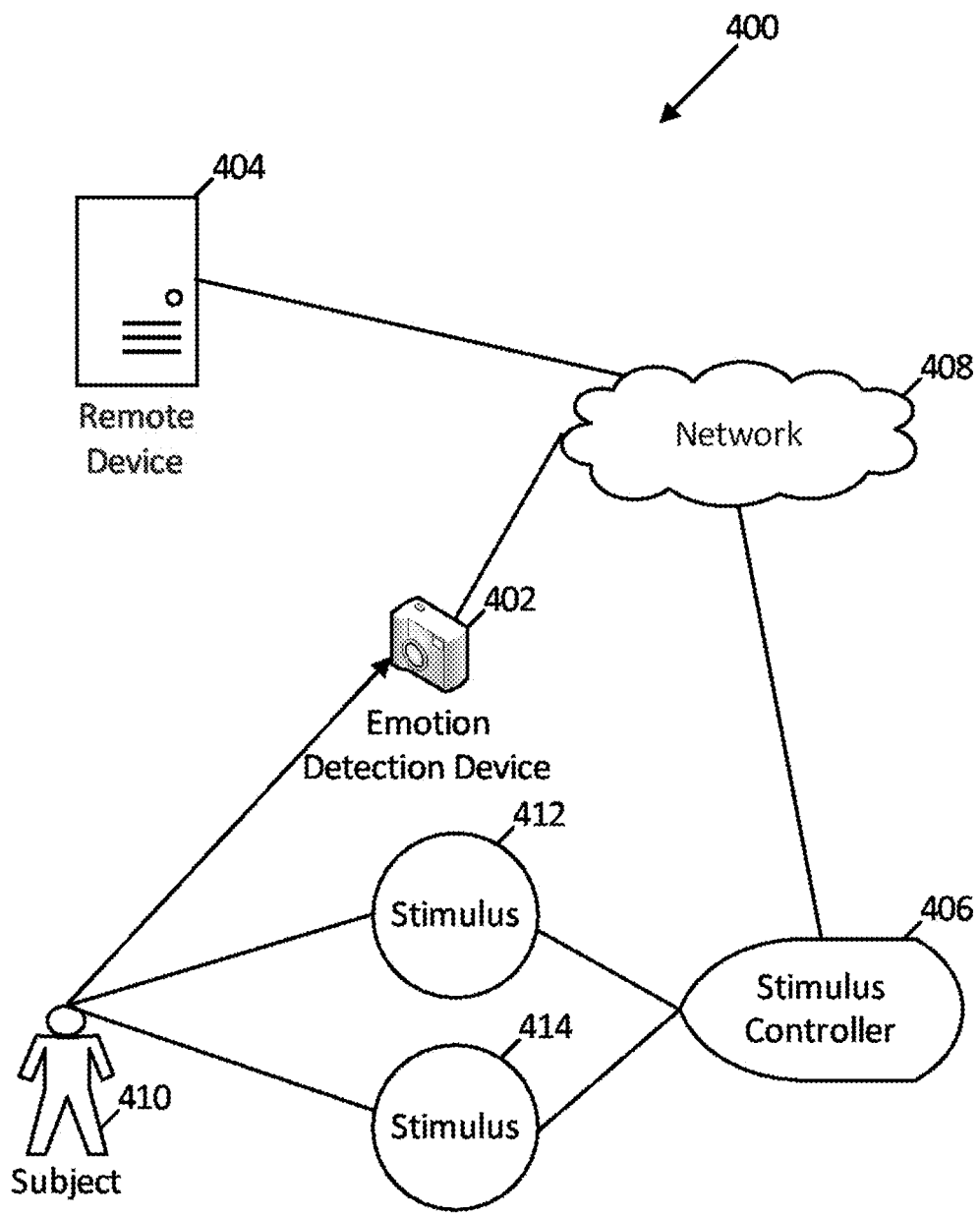
FIG. 4 illustrates an emotion detection system configured in accordance with an embodiment of the present disclosure.

FIG. 4 illustrates an emotion detection system 400 configured to monitor and, optionally, affect the emotional state of a subject 410. As shown, the emotion detection system 400 includes an emotion detection device 402, a remote device 404, a stimulus controller 406, and a network 408. The stimulus controller 406 may generate stimuli including stimulus 412 and stimulus 414. The emotion detection device 402 may include, for example, a PERS as described above with reference to FIGS. 1-3. The remote device may include any programmable device, such as any of the systems described below with reference to FIGS. 7 and 8. The communication network 408 may include any communication network through which systems may exchange information. For example, the network 408 may be a public network, such as the Internet, and may include other public or private networks such as LANs, WANs, extranets and intranets. As shown in FIG. 4, the emotion detection device 402, the remote device 404, and, optionally, the stimulus controller 406 are connected to and communicate data via the network 408.

The stimulus controller 406 may take the form of a variety of devices that function to provide stimulus to the subject 410. For instance, according to some examples the stimulus controller 406 is a programmable device, such as a gaming console, computer-enabled televisions, personal computer, laptop, or mobile phone. In these examples, the stimuli 412 and 414 may include content such as on-line shopping webpages, music, video games, television programming, and motion pictures.

In other examples, the stimulus controller 406 may not be connected to the network 408. Examples of disconnected stimulus controllers include theater projectors, non-computer-enabled televisions, signs, billboards, price tags, and consumer products. In these examples, the stimuli 412 and 414 may include content such as motion pictures, advertisements, prices, informational messages, and consumer product designs.

According to some examples, the emotion detection system 400 is configured to operate in a passive mode or an active mode. When operating in a passive mode, the emotion detection system 400 passively monitors the emotional state of the subject 410 as the stimulus controller 406 stimulates the subject according to commands received by the subject or some other user or system. When operating in active mode, the emotion detection system 400 monitors the emotional state of the subject and attempts to affect the emotional state of the subject in accord with one or more system objectives. Examples of processes that the emotion detection system 400 is configured to execute are described further below with reference to FIGS. 5 and 6.

Figure 5:
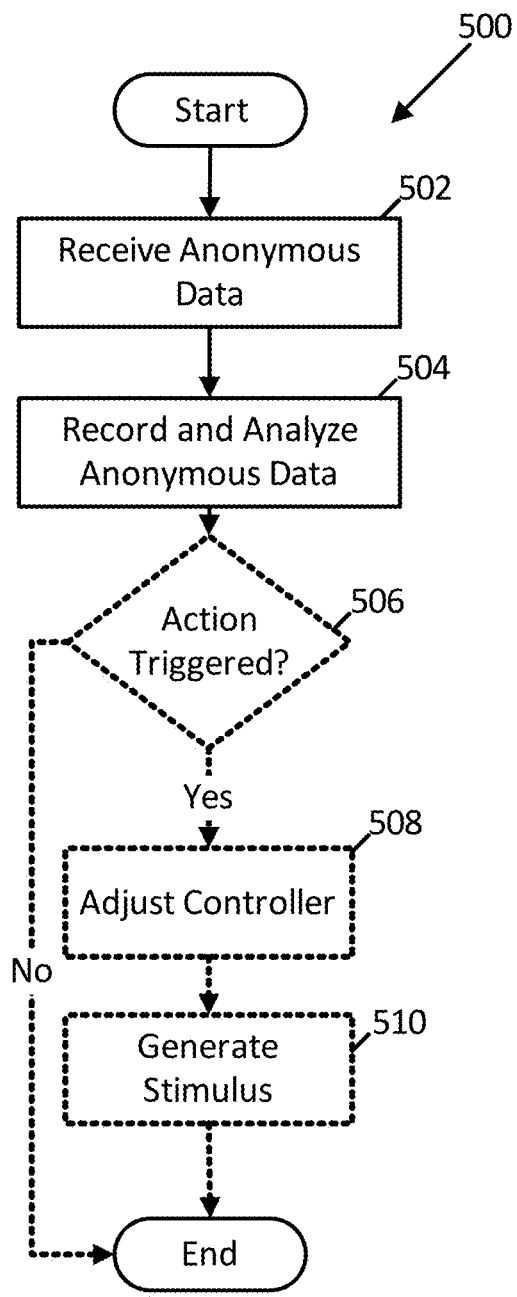
FIG. 5 illustrates an emotion monitoring process configured in accordance with an embodiment of the present disclosure.

According to some examples, an emotion detection system executes processes that monitor a subject's emotional state and, optionally, attempt to affect the subject's emotional state. FIG. 5 illustrates a monitoring process 500 in accord with these examples.

In act 502, the system executing the monitoring process 500 generates anonymous data by, for example, executing a process in accord with the detection process 200. In some examples, one component of the system generates the anonymous data and transmits it to another component of the system which receives and subsequently processes the anonymous data.

In act 504, the system records the anonymous data set within a data store, identifies a stimulus associated with the anonymous data set, and analyzes the anonymous data set to draw inferences from it. In some examples, the system identifies the stimulus associated with the anonymous data set by comparing one or more timestamps of the anonymous data set to one or more timestamps of the stimulus. Where a timestamp of the stimulus is shortly before the timestamp of the anonymous data set (e.g., between 100-500 milliseconds before), the system identifies the stimulus as being associated with the anonymous data set. Other identification methods, including express identifying values within the anonymous data set or the stimulus may be implemented without departing from the scope of the examples disclosed herein.

The particular mode of analysis and potential inferences drawn within the act 504 vary between examples. For instance, according to some examples, various data mining techniques are employed to determine (e.g., classify) an emotional state represented by one or more anonymous data sets. Examples of the data mining techniques that may be executed for this purpose include neural networks, k-nearest neighbor processes, and vector machines. In other examples, within the act 504, the system executes data mining prediction processes (e.g., logistical regression) to predict an emotional state of a subject or group of subjects based on a history of anonymous data sets received and processed by the system. In these examples, the system may create one or more summaries articulating these predictions for users of the system.

In act 506, the system determines whether the anonymous data, or the analysis thereof, triggers a system action defined by one or more configurable parameters. If so, the device proceeds to act 508. Otherwise, the monitoring process 500 ends.

In the act 508, the system adjusts configurable parameters of one or more stimulus controllers by transmitting a stimulus message to the one or more stimulus controllers. The stimulus message may include one or more requests to present additional stimulus to a subject. In the act 510, the one or more stimulus controllers generate stimulus 514, according to their configurable parameters, thereby attempting to alter the emotional state of a subject from a first emotional state to a second emotional state, and the monitoring process 500 ends.

Processes in accord with the monitoring process 500 enable emotion detection systems to monitor and, in some instances, influence the emotional state, and potentially the behavior, of a subject.

Figure 6:
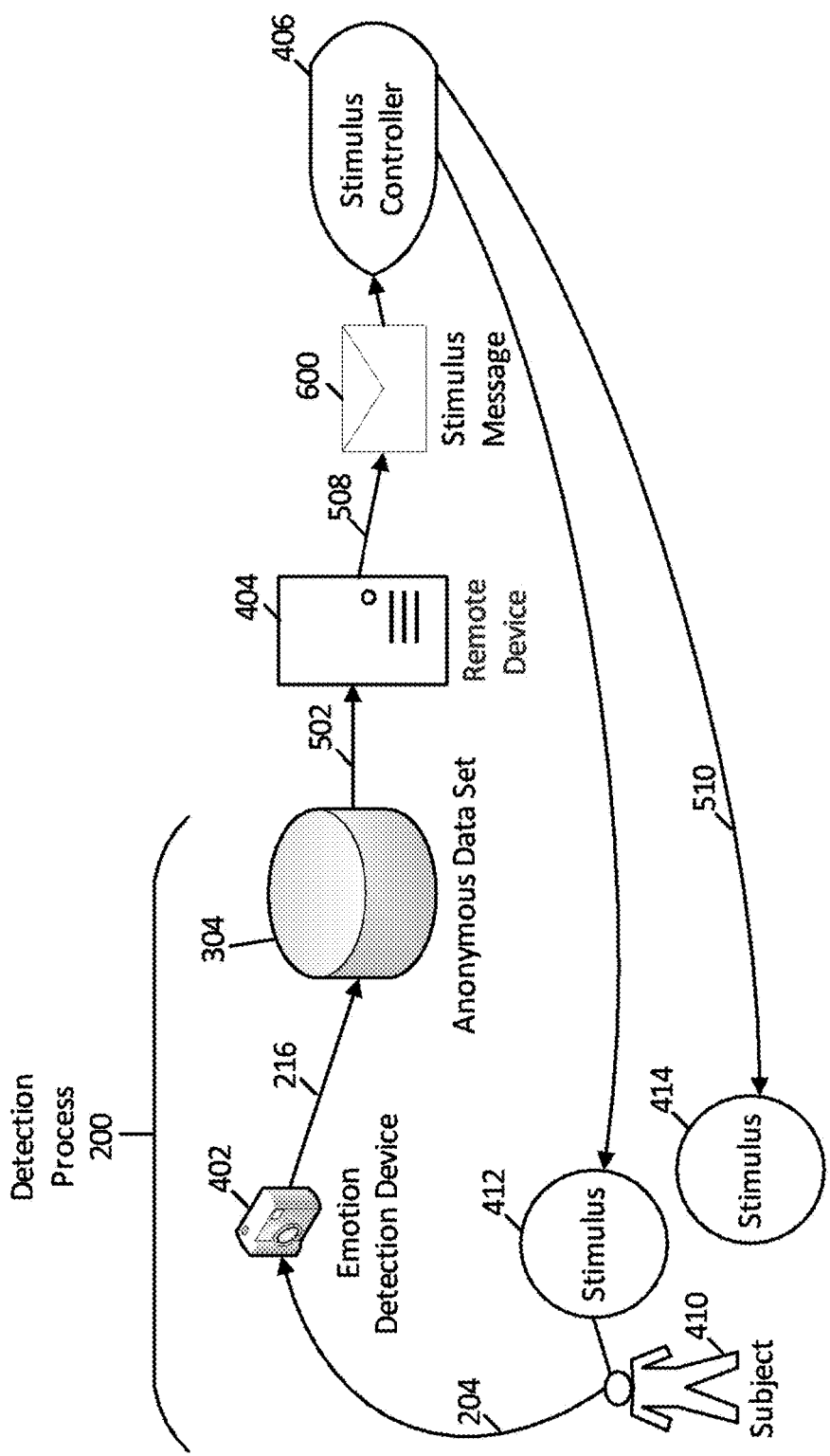
FIG. 6 illustrates an emotion detection system executing an emotion monitoring process configured in accordance with an embodiment of the present disclosure.

FIG. 6 is an input-output diagram that illustrates the operation of one example emotion detection system. FIG. 6 depicts the emotion detection system 400 of FIG. 4 executing the monitoring process 500 of FIG. 5. With primary reference to FIG. 6 in the combination of FIGS. 2-5, the emotion detection device 402 executes the act 204 to poll for an image of the subject 410 at a time shortly after (e.g., between 100-500 milliseconds after) presentation of the stimulus 412 to the subject 410. The emotion detection system 402 next executes acts 206-216 and generates the anonymous data set 304.

Continuing this example, the remote device 404 executes the act 502 to receive the anonymous data set 304 and records the data in a data store local to the remote device. Next, the remote device 404 executes the act 506 to determine whether recording of the anonymous data triggers an additional action by referencing the values of one or more configurable parameters. If the remote device 404 determines that no addition action has been triggered, processing terminates here. However, in this example, the remote device 404 determines that an additional action has been triggered and executes the act 508 to transmit a stimulus message 600 to the stimulus controller 406. The stimulus message 600 may include a request to present additional stimulus predicted to transition the emotional state of the subject to a new emotional state. In response to receiving the stimulus message 600, the stimulus controller 406 executes the act 510 to generate the stimulus 414. At this point, the activity described above may repeat with the emotion detection 402 executing the act 204 to poll for an image of the subject 410 at a time shortly after presentation of the stimulus 414 to the subject 410.

Emotion detection systems that are more specialized than those previously disclosed will now be described with reference to FIG. 6. One example of a specialized emotion detection system is directed to online or traditional broadcast content (e.g., stories, lectures, articles, movies, shows, amateur video, etc.). In this example, the emotion detection device 402 is positioned to view the subject 410 as the subject 410 receives the stimulus 412 by reviewing or interacting with the content. The remote device 404 records the anonymous data sets and further analyzes them to determine whether identified portions of the online content (e.g., news stories, songs, jokes, suspenseful scenes, dramatic scenes, scary scenes, etc.) had their intended effect on the emotional state of the subject 410. In this example, summaries of the analyzed anonymous data may be provided to content producers to enable them to improve future content. Alternatively, the summaries may be provided to content providers to enable them to make better suggestions as to which content may be most relevant to subjects in general or the subject 410 in particular.

Another example of a specialized emotion detection system is directed to video games. In this example, the emotion detection device 402 is positioned to view the subject 410 as the subject 410 receives the stimulus 412 by playing a video game. The remote device 404 records the anonymous data sets and further analyzes them to determine whether identified portions of the games (e.g., stages, puzzles, boss battles, cut scenes, etc.) had their intended effect on the emotional state of the subject 410. In this example, summaries of the analyzed anonymous data may be provided to video game producers to enable them to improve future games. Alternatively, the summaries may be provided to video game providers to enable them to make better suggestions as to which games may be most relevant to subjects in general or the subject 410 in particular.

Another example of a specialized emotion detection system is directed to online shopping. In this example, the emotion detection device 402 is positioned to view the subject 410 as the subject 410 receives the stimulus 412 by browsing websites in search of items to purchase. The remote device 404 records the anonymous data sets and further analyzes them to determine which items or prices caused positive and negative emotional reactions in the subject 410. Further, in this example, the stimulus controller 406 may present additional stimulus (e.g., the stimulus 414) in predefined situations. For instance, where the subject 410 expressed positive emotion when presented with an item without pricing information and subsequently expressed negative emotion when presented with a price, the remote device 404 may transmit a stimulus message 600 to discount the price by a specified percentage. In response to receiving the stimulus message 600, the stimulus controller 406 may transmit additional stimulus 414 in the form of the discounted price.

Additionally, in this example, the remote device 404 may analyze the anonymous data sets to produce summaries that indicate which products where of interest to the subject 410 and which were not of interest. These summaries of the analyzed anonymous data may be provided to item manufacturers to enable them to improve future items. Alternatively, the summaries may be provided to retailers to enable them to make better suggestions as to which items may be most relevant to subjects in general or the subject 410 in particular.

Another example of a specialized emotion detection system is directed to motion pictures presented in cinemas. In this example, the emotion detection device 402 is positioned to view the subject 410 as the subject 410 receives the stimulus 412 by viewing a motion picture in the cinema. The remote device 404 records the anonymous data sets and further analyzes them to determine whether identified portions of the motion picture (e.g., jokes, suspenseful scenes, dramatic scenes, scary scenes, etc.) had their intended effect on the emotional state of the subject 410. In this example, summaries of the analyzed anonymous data may be provided to motion picture producers to enable them to improve future motion pictures.

Another example of a specialized emotion detection system is directed to advertisement presented in signs and billboards. In this example, the emotion detection device 402 is positioned to view the subject 410 as the subject 410 receives the stimulus 412 by viewing an advertisement in on a sign or billboard. The remote device 404 records the anonymous data sets and further analyzes them whether the advertisement caused positive and negative emotional reaction in the subject 410 to determine whether the advertisement had its intended effect on the emotional state of the subject 410. Additionally, in this example, the remote device 404 may analyze the anonymous data sets to produce summaries that indicate which products where of interest to the subject 410 and which were not of interest. These summaries of the analyzed anonymous data may be provided to item manufacturers to enable them to improve future items. Alternatively, the summaries may be provided to retailers to enable them to make better suggestions as to which items may be most relevant to subjects in general or the subject 410 in particular.

Another example of a specialized emotion detection system is directed to actual shopping. In this example, the emotion detection device 402 is positioned to view the subject 410 as the subject 410 receives the stimulus 412 by browsing items to purchase in a brick-and-mortar retail establishment (e.g., a supermarket, department store, specialty store, etc.). The remote device 404 records the anonymous data sets and further analyzes them to determine which items or prices caused positive and negative emotional reactions in the subject 410. Further, in this example, the stimulus controller 406 may present additional stimulus (e.g., the stimulus 414) in predefined situations. For instance, where the subject 410 expressed positive emotion when presented with an item without pricing information and subsequently expressed negative emotion when presented with a price, the remote device 404 may transmit a stimulus message 600 to discount the price by a specified percentage. In response to receiving the stimulus message 600, the stimulus controller 406 may transmit additional stimulus 414 in the form of the discounted price.

Additionally, in this example, the remote device 404 may analyze the anonymous data sets to produce summaries that indicate which products where of interest to the subject 410 and which were not of interest. These summaries of the analyzed anonymous data may be provided to item manufacturers to enable them to improve future items. Alternatively, the summaries may be provided to retailers to enable them to make better suggestions as to which items may be most relevant to subjects in general or the subject 410 in particular.

Another example of a specialized emotion detection system is directed to automobile operation. In this example, the emotion detection device 402 is positioned to view the subject 410 as the subject 410 receives the stimulus 412 by driving an automobile and reviewing content provided by an in-vehicle entertainment system. The remote device 404 records the anonymous data sets and further analyzes them to determine which events (weather and traffic conditions, songs played on a radio, etc.) caused positive and negative emotional reactions in the subject 410. Further, in this example, the stimulus controller 406 may present additional stimulus (e.g., the stimulus 414) in predefined situations. For instance, where the subject 410 expressed negative emotion when presented with a weather or traffic condition, the remote device 404 may transmit a stimulus message 600 to calm the subject 410. In response to receiving the stimulus message 600, the stimulus controller 406 may provide additional stimulus 414 in the form of soothing music or a soothing message to relax the subject 410. In another example, where the subject 410 expresses a lack of emotion for a period of time that exceeds the value of a configurable parameter, the remote device 404 may transmit a stimulus message 600 to energize the subject 410. In response to receiving the stimulus message 600, the stimulus controller 406 may provide additional stimulus 414 in the form of energizing music, message or alarm to energize the subject 410.

In some examples, the components disclosed herein (e.g., the PERS 100, the emotion detection device 402, the remote device 404, and the stimulus controller 406) may read parameters that affect the operations performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). Further, some examples provide for both system and user interfaces that allow external entities to modify the parameters and thereby configure the behavior of the components.

Information within the emotion detection device 100 or the emotion detection system 400 may be stored in any logical and physical construction capable of holding information on a computer readable medium including, among other structures, linked lists, file systems, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

Information may flow between the components disclosed herein using a variety of techniques. Such techniques include, for example, passing the information over a network using standard protocols, such as TCP/IP or HTTP, passing the information between modules in memory and passing the information by writing to a file, database, data store, or some other non-volatile data storage device. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

Example System

Figure 7:
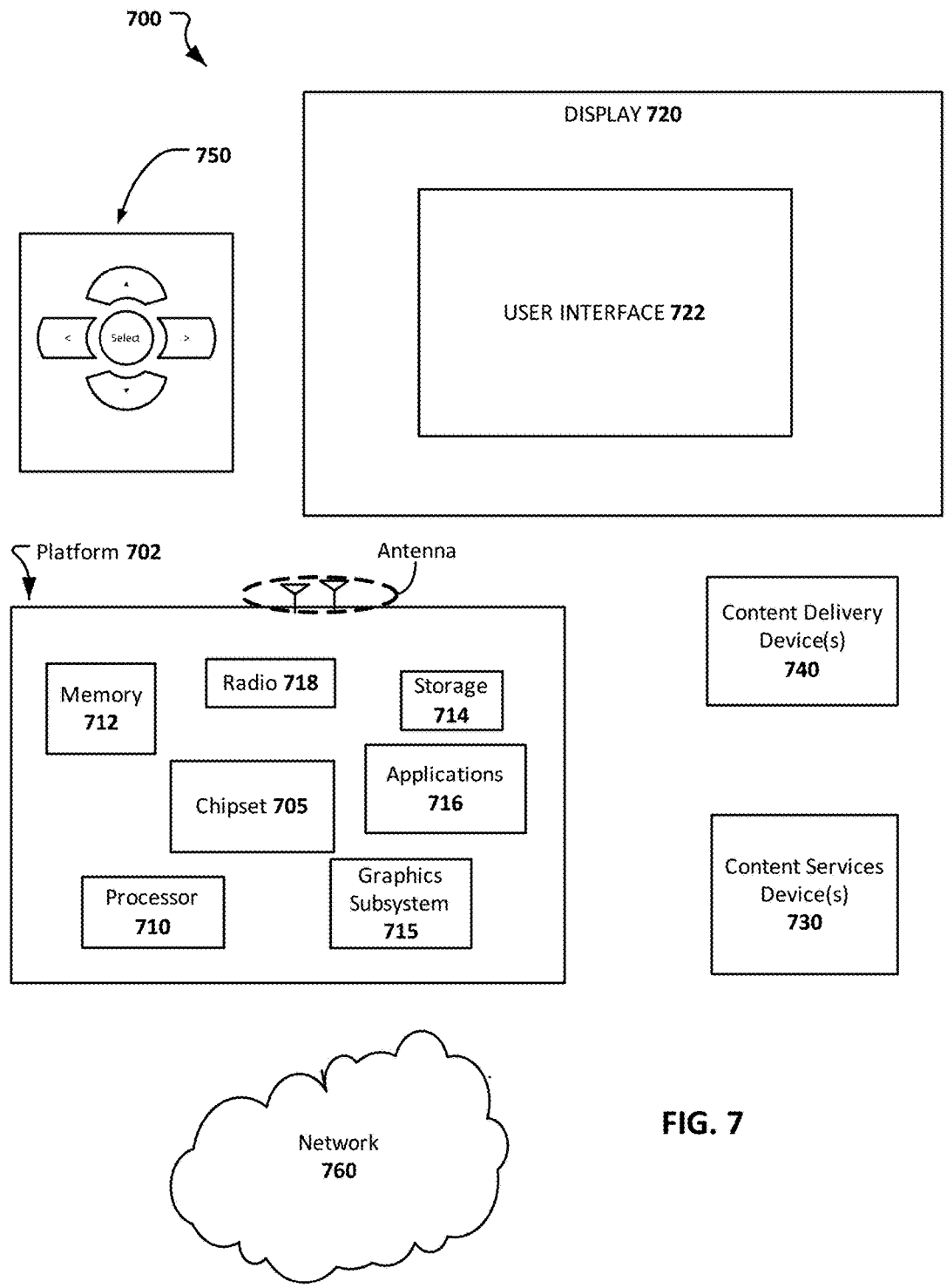
FIG. 7 illustrates a computing system configured in accordance with an embodiment of the present disclosure.

FIG. 7 illustrates a computing system 700 configured in accordance with an embodiment of the present disclosure. In some embodiments, system 700 may be a computing system for detecting emotional states of subjects although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations and displaying content.

In some embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720, so as to supplement navigational gesturing by the user. Each of these example components is described in more detail below.

In some embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 710 may comprise dual-core processor(s), dual-core mobile processor(s), and so forth. Memory 712 may be implemented, for instance, as a volatile memory device such as, but not limited to, a Random Access Memory (RAM), Dynamic Random Access Memory (DRAM), or Static RAM (SRAM). Storage 714 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 714 may comprise technology to increase the storage performance enhanced protection for valuable digital media when multiple hard drives are included, for example.

Graphics subsystem 715 may perform processing of images such as still or video for display, and in some embodiments is configured to drive the array of light sources of a direct view display, as variously described herein. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705. The graphics and/or video processing techniques, including direct view projection techniques described herein, may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In some embodiments, display 720 may comprise any television or computer type monitor or display. Under the control of one or more software applications 716, platform 702 may display a user interface 722 on display 720.

In some embodiments, content services device(s) 730 may be hosted by any national, international and/or independent service and thus accessible to platform 702 via the Internet or other network, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720. In some embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, graphics, text, medical and gaming content, and so forth.

Content services device(s) 730 receives content such as cable television programming including media information, digital information, and/or other content. Examples of content providers may include any cable or satellite television or radio or Internet content providers. The provided examples are not meant to limit the present disclosure. In some embodiments, platform 702 may receive control signals from navigation controller 750 having one or more navigation features. The navigation features of controller 750 may be used to interact with user interface 722, for example. In some embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures, facial expressions, or sounds.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In some embodiments, controller 750 may not be a separate component but integrated into platform 702 and/or display 720. Embodiments, however, are not limited to the elements or in the context shown or described herein, as will be appreciated.

In some embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chipset 705 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the present disclosure.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, image, video, text and so forth. Control information may refer to any data representing commands, instructions or control words meant for an automated system. For example, control information may be used to route media information through a system, or instruct a node to process the media information in a predetermined manner (e.g., using hardware assisted for privilege access violation checks as described herein). The embodiments, however, are not limited to the elements or context shown or described in FIG. 7.

Figure 8:
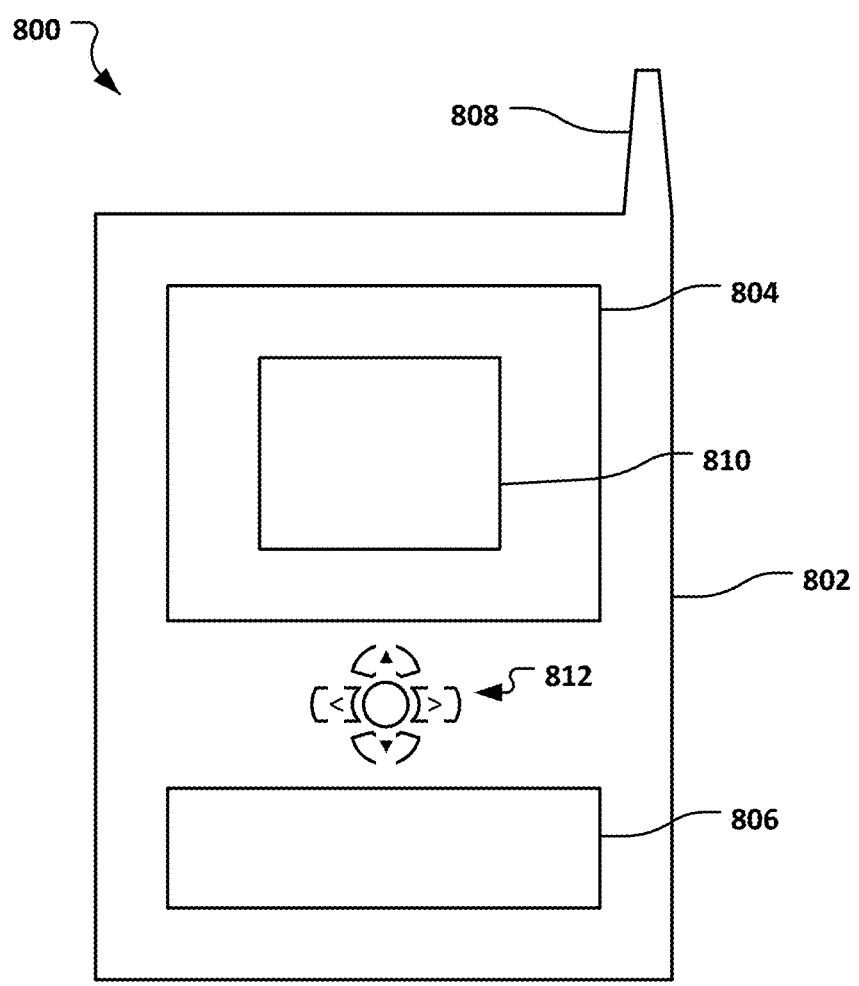
FIG. 8 illustrates a mobile computing system configured in accordance with an embodiment of the present disclosure.

As described above, system 700 may be embodied in varying physical styles or form factors. FIG. 8 illustrates embodiments of a small form factor device 800 in which system 700 may be embodied. In some embodiments, for example, device 800 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device, which in one example embodiment is a pixelated display capable of direct view as provided herein. I/O device 806 may comprise any suitable I/O device for entering information into a mobile computing device. Examples for I/O device 806 may include an alphanumeric keyboard, a numeric keypad, a touch pad, input keys, buttons, a camera, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with an embodiment of the present disclosure. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

Further Example Embodiments

The following examples pertain to further embodiments, from which numerous permutations and configurations will be apparent.

Example 1 is an emotion detection system comprising an emotion detection device including: a memory; at least one processor coupled to the memory; and a face image processing module executable by the at least one processor and configured to: receive image data depicting a face of a subject; analyze the image data to identify a plurality of points on the face; store an anonymous data set descriptive of the plurality of points, each element of the anonymous data set including an identifier field and a location field; transmit the anonymous data set to a remote device distinct from the emotion detection device; and delete the image data.

Example 2 includes the subject matter of Example 1, wherein the image data includes at least one of two-dimensional image data and three-dimensional image data.

Example 3 includes the subject matter of any of the preceding Examples, wherein the face image processing module is configured to: analyze the image data at least in part by normalizing a data set to a generic face; and store the anonymous data at least in part by storing the data set.

Example 4 includes the subject matter of any of the preceding Examples, wherein the image data includes landmark points.

Example 5 includes the subject matter of any of the preceding Examples, wherein the location of each element of the anonymous data set includes at least one of a two-dimensional value and a three-dimensional value.

Example 6 includes the subject matter of any of the preceding Examples, wherein the emotion detection device further comprises a camera configured to acquire the image data, wherein the face image processing module is configured to deactivate the camera prior to analyzing the image data, storing the anonymous data set, and transmitting the anonymous data set.

Example 7 includes the subject matter of Example 6, wherein the emotion detection device further comprises a housing that includes the camera, the memory, the at least one processor, and the face image processing module.

Example 8 includes the subject matter of any of the preceding Examples, further comprising the remote device, wherein the remote device is configured to: identify a stimulus provided to the subject prior to receiving the image data; and analyze the anonymous data set to determine an emotional state of the subject when presented the stimulus.

Example 9 includes the subject matter of Example 8, wherein the stimulus includes at least one of non-interactive content and interactive content.

Example 10 includes the subject matter of any of the preceding Examples, wherein the stimulus includes a portion of content provided to the subject.

Example 11 includes the subject matter of Example 10, wherein the portion of content includes a sequence of video frames.

Example 12 includes the subject matter of any of the preceding Examples, further comprising a stimulus controller configured to stimulate the subject.

Example 13 includes the subject matter of Example 12, further comprising the remote device, wherein the remote device is configured to transmit a message to the stimulus controller and the stimulus controller is configured to simulate the subject in response to receiving the message.

Example 14 includes the subject matter of any of the preceding Examples, further comprising the remote device, wherein the remote device is configure to: analyze the anonymous data to identify an estimated emotional state of the subject; identify a target emotional state for the subject based on the estimated emotional state of the subject; identify a stimulus to transition the subject to the target emotional state; and stimulate the subject with the stimulus.

Example 15 is a method of detecting emotions using a device, the method comprising: receiving image data depicting a face of a subject; analyzing the image data to identify a plurality of points on the face; storing an anonymous data set descriptive of the plurality of points, each element of the anonymous data set including an identifier field and a location field; transmitting the anonymous data set to a remote device distinct from the device; and deleting the image data.

Example 16 includes the subject matter of Example 15, wherein receiving the image data includes receiving at least one of two-dimensional image data and three-dimensional image data.

Example 17 includes the subject matter of Example 15 or 16, wherein analyzing the image data includes normalizing a data set to a generic face and storing the anonymous data set includes storing the data set.

Example 18 includes the subject matter of any of Examples 15 through 17, wherein analyzing the image data includes identifying landmark points.

Example 19 includes the subject matter of any of Examples 15 through 18, wherein storing the anonymous data set includes storing at least one of a two-dimensional value and three-dimensional value in the location field of each element.

Example 20 includes the subject matter of any of Examples 15 through 19, further comprising: acquiring the image data via a camera; and deactivating the camera prior to analyzing the image data, storing the anonymous data set, and transmitting the anonymous data set.

Example 21 includes the subject matter of Example 20, wherein acquiring the image data includes acquiring the image data from a camera integral to the device.

Example 22 includes the subject matter of any of Examples 15 through 21, further comprising: identifying a stimulus provided to the subject prior to receiving the image data; and analyzing the anonymous data set to determine an emotional state of the subject when presented the stimulus.

Example 23 includes the subject matter of Example 22, wherein identifying the stimulus includes identifying at least one of non-interactive content and interactive content.

Example 24 includes the subject matter of any of Examples 15 through 23, wherein identifying the stimulus includes identifying a portion of content provided to the subject.

Example 25 includes the subject matter of Example 24, wherein identifying the portion of content includes identifying at least one of a sequence of video frames within the content and one or more time offsets within the content.

Example 26 includes the subject matter of any of Examples 15 through 25, further comprising stimulating the subject.

Example 27 includes the subject matter of Example 26, wherein stimulating the subject includes: transmitting a message from the remote device to a stimulus controller; and generating a stimulus to simulate the subject.

Example 28 includes the subject matter of any of Examples 15 through 27, further comprising: analyzing the anonymous data to identify an estimated emotional state of the subject; identifying a target emotional state for the subject based on the estimated emotional state of the subject; identifying a stimulus to transition the subject to the target emotional state; and stimulating the subject with the stimulus.

Example 29 is a non-transient computer program product encoded with instructions that when executed by one or more processors cause a process for detecting emotions to be carried out, the process comprising: receiving image data depicting a face of a subject; analyzing the image data to identify a plurality of points on the face; storing an anonymous data set descriptive of the plurality of points, each element of the anonymous data set including an identifier field and a location field; transmitting the anonymous data set to a remote device distinct from the device; and deleting the image data.

Example 30 includes the subject matter of Example 29, wherein receiving the image data includes receiving at least one of two-dimensional image data and three-dimensional image data.

Example 31 includes the subject matter of Example 29 or 30, wherein analyzing the image data includes normalizing a data set to a generic face and storing the anonymous data set includes storing the data set.

Example 32 includes the subject matter of any of Examples 29 through 31, wherein analyzing the image data includes identifying landmark points.

Example 33 includes the subject matter of any of Examples 29 through 32, wherein storing the anonymous data set includes storing at least one of a two-dimensional value and three-dimensional value in the location field of each element.

Example 34 includes the subject matter of any of Examples 29 through 33, further comprising: acquiring the image data via a camera; and deactivating the camera prior to analyzing the image data, storing the anonymous data set, and transmitting the anonymous data set.

Example 35 includes the subject matter of Example 34, wherein acquiring the image data includes acquiring the image data from a camera integral to the device.

Example 36 includes the subject matter of any of Examples 29 through 35, further comprising: identifying a stimulus provided to the subject prior to receiving the image data; and analyzing the anonymous data set to determine an emotional state of the subject when presented the stimulus.

Example 37 includes the subject matter of Example 36, wherein identifying the stimulus includes identifying at least one of non-interactive content and interactive content.

Example 38 includes the subject matter of any of Examples 29 through 37, wherein identifying the stimulus includes identifying a portion of content provided to the subject.

Example 39 includes the subject matter of Example 38, wherein identifying the portion of content includes identifying at least one of a sequence of video frames within the content and one or more time offsets within the content.

Example 40 includes the subject matter of any of Examples 29 through 39, further comprising stimulating the subject.

Example 41 includes the subject matter of Example 40, wherein stimulating the subject includes: transmitting a message from the remote device to a stimulus controller; and generating a stimulus to simulate the subject.

Example 42 includes the subject matter of any of Examples 29 through 41, further comprising: analyzing the anonymous data to identify an estimated emotional state of the subject; identifying a target emotional state for the subject based on the estimated emotional state of the subject; identifying a stimulus to transition the subject to the target emotional state; and stimulating the subject with the stimulus.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. An emotion detection system comprising an emotion detection device including:
   a memory;
   at least one processor coupled to the memory; and
   a face image processing module executable by the at least one processor and configured to:
      receive image data depicting a face of a subject;
      analyze the image data to identify a plurality of points on the face;
      store an anonymous data set descriptive of the plurality of points, each element of the anonymous data set including an identifier field and a location field;
      transmit the anonymous data set to a remote device distinct from the emotion detection device; and
      delete the image data.

2. The emotion detection system of claim 1, wherein the image data includes at least one of two-dimensional image data and three-dimensional image data.

3. The emotion detection system of claim 1, wherein the face image processing module is configured to:
   analyze the image data at least in part by normalizing a data set to a generic face; and
   store the anonymous data at least in part by storing the data set.

4. The emotion detection system of claim 1, wherein the image data includes landmark points.

5. The emotion detection system of claim 1, wherein the location field of each element of the anonymous data set includes at least one of a two-dimensional value and a three-dimensional value.

6. The emotion detection system of claim 1, wherein the emotion detection device further comprises a camera configured to acquire the image data, and wherein the face image processing module is configured to deactivate the camera prior to analyzing the image data, storing the anonymous data set, and transmitting the anonymous data set.

7. The emotion detection system of claim 6, wherein the emotion detection device further comprises a housing that includes the camera, the memory, the at least one processor, and the face image processing module.

8. The emotion detection system of claim 1, further comprising the remote device, wherein the remote device is configured to:
identify a stimulus provided to the subject prior to receiving the image data; and
analyze the anonymous data set to determine an emotional state of the subject when presented the stimulus.

9. The emotion detection system of claim 8, wherein the stimulus includes at least one of non-interactive content and interactive content.

10. The emotion detection system of claim 8, wherein the stimulus includes a portion of content provided to the subject.

11. The emotion detection system of claim 10, wherein the portion of content includes a sequence of video frames.

12. The emotion detection system of claim 1, further comprising a stimulus controller configured to stimulate the subject.

13. The emotion detection system of claim 12, further comprising the remote device, wherein the remote device is configured to transmit a message to the stimulus controller and the stimulus controller is configured to simulate the subject in response to receiving the message.

14. The emotion detection system of claim 1, further comprising the remote device, wherein the remote device is configure to:
analyze the anonymous data to identify an estimated emotional state of the subject;
identify a target emotional state for the subject based on the estimated emotional state of the subject;
identify a stimulus to transition the subject to the target emotional state; and
stimulate the subject with the stimulus.

15. A method of detecting emotions using a device, the method comprising:
receiving image data depicting a face of a subject;
analyzing the image data to identify a plurality of points on the face;
storing an anonymous data set descriptive of the plurality of points, each element of the anonymous data set including an identifier field and a location field;
transmitting the anonymous data set to a remote device distinct from the device; and
deleting the image data.

16. The method of claim 15, wherein analyzing the image data includes normalizing a data set to a generic face and storing the anonymous data set includes storing the data set.

17. The method of claim 15, wherein analyzing the image data includes identifying landmark points.

18. The method of claim 15, further comprising:
acquiring the image data via a camera; and
deactivating the camera prior to analyzing the image data, storing the anonymous data set, and transmitting the anonymous data set.

19. The method of claim 15, further comprising:
identifying a stimulus provided to the subject prior to receiving the image data; and
analyzing the anonymous data set to determine an emotional state of the subject when presented the stimulus.

20. The method of claim 19, wherein identifying the stimulus includes identifying a portion of content provided to the subject.

21. The method of claim 20, wherein identifying the portion of content includes identifying at least one of a sequence of video frames within the content and one or more time offsets within the content.

22. A non-transient computer program product encoded with instructions that when executed by one or more processors of a device cause a process for detecting emotions to be carried out, the process comprising:
receiving image data depicting a face of a subject;
analyzing the image data to identify a plurality of points on the face;
storing an anonymous data set descriptive of the plurality of points, each element of the anonymous data set including an identifier field and a location field;
transmitting the anonymous data set to a remote device distinct from the device; and
deleting the image data.

23. The computer program product of claim 22, wherein analyzing the image data includes normalizing a data set to a generic face and storing the anonymous data set includes storing the data set.

24. The computer program product of claim 22, further comprising:
identifying a stimulus provided to the subject prior to receiving the image data; and
analyzing the anonymous data set to determine an emotional state of the subject when presented the stimulus.

* * * * *